United States Patent
Dykes (10) Patent No.: US 10,942,503 B2
(45) Date of Patent: Mar. 9, 2021

(54) MOBILE DATA STORAGE DEVICE WITH PREDICTED TEMPERATURE MANAGEMENT VIA COMMAND TIME DELAY

(71) Applicant: Seagate Technology LLC, Cupertino, CA (US)

(72) Inventor: James Edward Dykes, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 986 days.

(21) Appl. No.: 14/917,447

(22) PCT Filed: Sep. 5, 2014

(86) PCT No.: PCT/US2014/054256
§ 371 (c)(1),
(2) Date: Mar. 8, 2016

(87) PCT Pub. No.: WO2015/035141
PCT Pub. Date: Mar. 12, 2015

(65) Prior Publication Data
US 2016/0224011 A1     Aug. 4, 2016

Related U.S. Application Data

(60) Provisional application No. 61/875,430, filed on Sep. 9, 2013.

(51) Int. Cl.
*G05B 19/406* (2006.01)
*G06F 1/20* (2006.01)
(Continued)

(52) U.S. Cl.
CPC ....... *G05B 19/406* (2013.01); *G05D 23/1393* (2013.01); *G06F 1/20* (2013.01);
(Continued)

(58) Field of Classification Search
CPC ........ G05B 19/406; G05B 2219/37431; G06F 1/3268; G06F 1/203; G06F 1/206;
(Continued)

(56) References Cited

U.S. PATENT DOCUMENTS 5,155,831 A    10/1992  Emma et al.
5,200,944 A     4/1993  Souma
(Continued)

FOREIGN PATENT DOCUMENTS

CN    1117607 A    2/1996
CN    1498382 A    5/2004
(Continued)

*Primary Examiner* — Michael Jung
(74) *Attorney, Agent, or Firm* — Hall Estill Attorneys at Law (57) ABSTRACT

A mobile data storage device (102) may be housed in a mobile computing device (142) without an active cooling feature. The mobile data storage device (102) can have at least a controller (122) configured to delay command execution in response to a predicted mobile data storage device (102) temperature. The controller (122) can insert a plurality of delays into a command queue to prevent the mobile data storage device (102) from reaching the predicted mobile data storage device (102) temperature.

20 Claims, 4 Drawing Sheets

(51) Int. Cl.
*G06F 1/324* (2019.01)
*G06F 1/3234* (2019.01)
*G06F 1/3237* (2019.01)
*G11B 5/40* (2006.01)
*G05D 23/13* (2006.01)
*G11B 19/28* (2006.01)

(52) U.S. Cl.
CPC .............. *G06F 1/203* (2013.01); *G06F 1/206* (2013.01); *G06F 1/324* (2013.01); *G06F 1/3237* (2013.01); *G06F 1/3268* (2013.01); *G06F 1/3275* (2013.01); *G11B 5/40* (2013.01); *G11B 19/28* (2013.01); *G05B 2219/37431* (2013.01); *Y02D 10/00* (2018.01)

(58) Field of Classification Search
CPC ...... G06F 1/3237; G06F 1/324; G06F 1/3275; G05D 23/1393; Y02D 10/16; G11B 19/28; G11B 5/40
See application file for complete search history.

(56) References Cited

U.S. PATENT DOCUMENTS

| | | | |
|---|---|---|---|
| 5,216,655 A | 6/1993 | Hearn et al. | |
| 5,481,733 A | 1/1996 | Douglis et al. | |
| 5,774,292 A | 6/1998 | Georgiou et al. | |
| 6,021,076 A * | 2/2000 | Woo | G06F 1/206 365/211 |
| 6,198,245 B1 | 3/2001 | Du et al. | |
| 6,747,926 B1 | 6/2004 | Potrykus et al. | |
| 6,772,352 B1 * | 8/2004 | Williams | G11C 11/406 711/104 |
| 7,068,456 B2 | 6/2006 | Walz | |
| 7,099,735 B2 * | 8/2006 | Jain | G01K 7/42 374/E7.042 |
| 7,143,203 B1 | 11/2006 | Altmejd | |
| 7,177,528 B1 | 2/2007 | Yada et al. | |
| 7,721,128 B2 * | 5/2010 | Johns | G01K 3/005 713/322 |
| 7,814,351 B2 | 10/2010 | Lubbers et al. | |
| 7,840,820 B2 | 11/2010 | Shimada | |
| 7,986,483 B1 | 7/2011 | Susanto et al. | |
| 2002/0039334 A1 | 4/2002 | Yamakawa et al. | |
| 2002/0083354 A1 * | 6/2002 | Adachi | G06F 1/206 713/322 |
| 2002/0105877 A1 | 8/2002 | Kajino et al. | |
| 2004/0019776 A1 | 1/2004 | Sato et al. | |
| 2004/0064745 A1 * | 4/2004 | Kadambi | G06F 1/3203 713/322 |
| 2004/0246843 A1 | 12/2004 | Chang | |
| 2005/0007918 A1 | 1/2005 | Tokudome et al. | |
| 2005/0117477 A1 | 6/2005 | Kajino et al. | |
| 2005/0144491 A1 | 6/2005 | Zayas | |
| 2005/0216775 A1 * | 9/2005 | Inoue | G06F 1/206 713/300 |
| 2005/0240684 A1 | 11/2005 | Vadde et al. | |
| 2005/0265140 A1 | 12/2005 | Atkinson | |
| 2006/0254296 A1 * | 11/2006 | Finkelstein | G06F 1/206 62/259.2 |
| 2007/0070539 A1 | 3/2007 | Lee et al. | |
| 2007/0121492 A1 * | 5/2007 | Johns | G01K 3/005 370/223 |
| 2007/0140030 A1 * | 6/2007 | Wyatt | G11C 5/00 365/212 |
| 2007/0198134 A1 | 8/2007 | Adachi et al. | |
| 2008/0010557 A1 | 1/2008 | Kume | |
| 2009/0125741 A1 | 5/2009 | Burton | |
| 2009/0158010 A1 * | 6/2009 | Gartner | G06F 1/3203 712/220 |
| 2009/0242186 A1 | 10/2009 | Koshiyama | |
| 2009/0268360 A1 * | 10/2009 | Shinomiya | H02H 9/046 361/56 |
| 2010/0011168 A1 | 1/2010 | Ryu et al. | |
| 2010/0180089 A1 * | 7/2010 | Flemming | G06F 1/206 711/157 |
| 2010/0290149 A1 * | 11/2010 | Ahmad | G11B 19/043 360/71 |
| 2011/0185209 A1 | 7/2011 | Shimotono | |
| 2012/0066439 A1 | 3/2012 | Fillingim | |
| 2012/0166839 A1 * | 6/2012 | Sodhi | G06F 1/206 713/322 |
| 2013/0080680 A1 * | 3/2013 | Chu | G11C 7/04 711/102 |
| 2013/0111191 A1 * | 5/2013 | Murray | G06F 9/384 712/214 |
| 2014/0047261 A1 * | 2/2014 | Patiejunas | G06F 1/266 713/330 |

FOREIGN PATENT DOCUMENTS

| | | |
|---|---|---|
| CN | 1934628 A | 3/2007 |
| CN | 101813965 A | 8/2010 |
| CN | 102624865 A | 8/2012 |
| CN | 103123788 A | 5/2013 |
| CN | 104137024 A | 11/2014 |
| EP | 0851336 A1 | 7/1998 |
| EP | 0737909 B1 | 7/2002 |
| JP | H0193832 A | 4/1989 |
| JP | H0887383 A | 4/1996 |
| JP | H10283767 A | 10/1998 |
| JP | 2006179110 A | 7/2006 |
| JP | 2007087576 A | 4/2007 |
| JP | 2007310974 A | 11/2007 |
| JP | 2008171199 A | 7/2008 |
| JP | 2009238020 A | 10/2009 |
| JP | 2010020774 A | 1/2010 |
| JP | 2011150610 A | 8/2011 |
| JP | 2012238364 A | 12/2012 |
| KR | 10-2004-0108799 | 12/2004 |
| WO | 2011/061783 A1 | 5/2011 |
| WO | 2012/094558 A1 | 7/2012 |
| WO | 2012094556 A1 | 7/2012 |
| WO | 2013/112279 A1 | 8/2013 |

* cited by examiner

MOBILE DATA STORAGE DEVICE WITH PREDICTED TEMPERATURE MANAGEMENT VIA COMMAND TIME DELAY

SUMMARY

Assorted embodiments a mobile data storage device housed in a mobile computing device without an active cooling feature. The mobile data storage device can have at least a controller configured to delay command execution in response to a predicted mobile data storage device temperature.

DETAILED DESCRIPTION

The proliferation of mobile electronics into smaller form factors and greater computing capabilities, higher amounts of data are created, processed, and stored in local data storage devices, such as a rotating hard drive, solid state memory array, and hybrid hard drive. Increasing network bandwidth and advances in streaming data has further increased the amounts of data being accessed by a data storage device and consequently the amount of heat being produced and power being consumed. While a data storage device can satisfy such increased data accesses without approaching operational limits by employing convective cooling via a fan, mobile electronics like tablet computers and smartphones do not have air moving capabilities. Thus, increased data usage in a mobile electronics device can threaten a data storage device's function and accuracy when a temperature management scheme is not implemented.

Accordingly, various embodiments of the present disclosure provide a temperature management scheme that can optimize heat production and power consumption in a data storage portion of a mobile electronics device that doesn't have a means to provide convective cooling. That is, a data storage device housed in a mobile computing environment can have at least a controller configured to selectively adjust power consumption of the data storage device to alter a temperature of the data storage device. The ability to adjust temperature of the data storage device without the use of moving air allows rotating data storage devices like a hard disk drive to be used in mobile electronics to provide large data capacity with greater long-term integrity than solid state memory like dynamic random access (DRAM) memory and flash memory.

Figure 1:
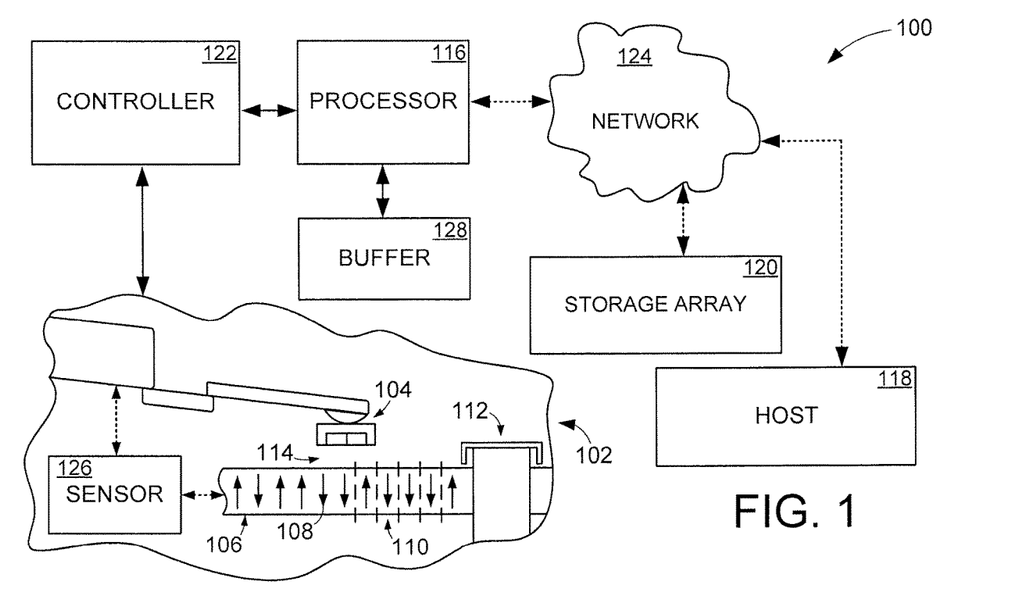
FIG. 1 is a block representation of an example data storage system configured and operated in accordance with some embodiments.

It is contemplated that a data storage device employing a temperature management scheme can be utilized in an unlimited variety of data storage environments that may or may not have convective cooling capabilities. However, assorted embodiments utilize a temperature managing data storage device in the example data storage system 100 of FIG. 1 that is displayed as a block representation. The data storage system 100 can engage one or more data storage devices 102. FIG. 1 illustrates a block representation of a portion of an example data storage device 102 that is equipped with a transducing head 104 that can respectively be positioned over selected locations on a magnetic storage medium 106, such as over one or more stored data bits 108 organized in data tracks 110.

The storage medium 106 can be attached to one or more spindle motors 112 that rotate the medium 108 to produce an air bearing 114 on which the transducing head 104 flies to access predetermined portion of the medium 106. In this way, one or more local 116 processors and remote hosts 118 can provide controlled motion of the transducing head 104 and spindle 112 to adjust and align the transducing head 104 with selected data bits 108. With the advent of network computing has allowed remote hosts 118 and storage arrays 120 access to a controller 122 through a network 124 via appropriate protocol.

The remote host 118 and local processor 116 can act independently or concurrently to monitor and control one or more sensors 126 that continuously or sporadically read operating conditions of the data storage medium 106, like vibration and temperature, as well as the spindle 112, such as rotational speed and power consumption. The local processor 116 and remote host 118 may further populate, organize, and execute command requests in a memory buffer 128 that can be configured as volatile and non-volatile memory cells to provide temporary storage of data and data information that are pending for execution by the data storage device 102 and controller 122.

Figure 2A:
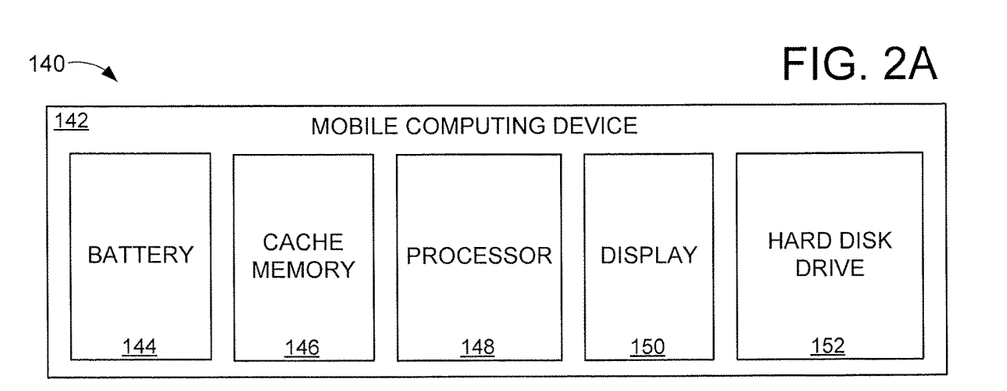
FIGS. 2A and 2B respectively display representations of an example data storage device capable of being used in the data storage system of FIG. 1.
Figure 2B:
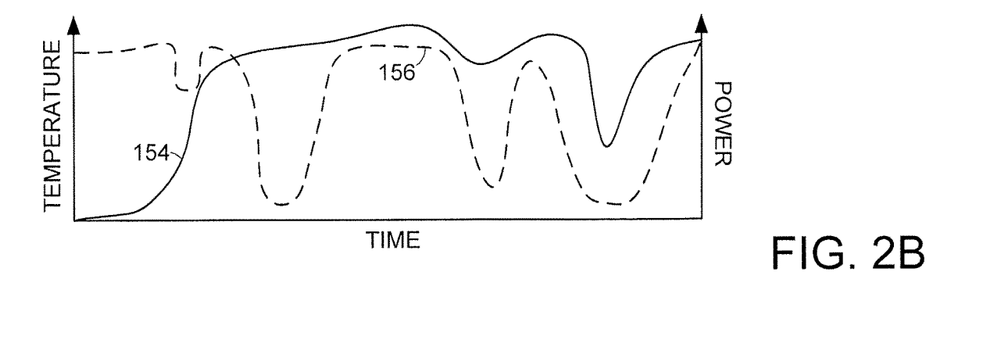

The minimization of the physical dimensions of the data storage components, like the transducing head 104, can allow for implementation into mobile electronics that are continually striving for smaller form factors and greater computing capabilities. FIGS. 2A and 2B respectively illustrate different representations of an example mobile computing system 140 that can be used in the data storage system of FIG. 1. As shown in FIG. 2A, the mobile computing system 140 may comprise one or more mobile computing devices 142 that can communicate data via wired and wireless pathways to static and virtual mobile devices. For example, the mobile computing device 142 may have a serial bus capable of wired connection to a stationary desktop and server as well as a network protocol allowing wireless connection with a virtual cloud node, server, and other mobile computing devices.

While not required or limiting, a mobile computing device 142 can consist of a battery 144 that provides power and may, or may not, be rechargeable. A cache memory 146 can provide short-term storage for data that may be processed by a processor 148, graphically shown on a display 150, and moved to a hard disk drive 152 for long-term storage. While the mobile computing device 142 can function without means for cooling the constituent components, operation of the various mobile computing components individually and collectively can serve to produce heat through the consumption of power provided by the battery 144.

Regardless of the type, size, and performance of the data storage in the mobile computing device 142, the heat produced from operation can jeopardize the performance of the mobile computing device 142. In other words, heat is produced from solid-state memory arrays and hard disk drives and such heat can degrade the ability of those data storage means to read, write, and output data accurately. An example relationship between temperature of a mobile computing device 146 and power consumption of the device 146 over time is provided by solid line 154 and segmented line 156. It can be appreciated that heat is retained in the mobile computing device due at least to the operation of constituent components, environmental conditions, and interaction with a user.

Figure 3:
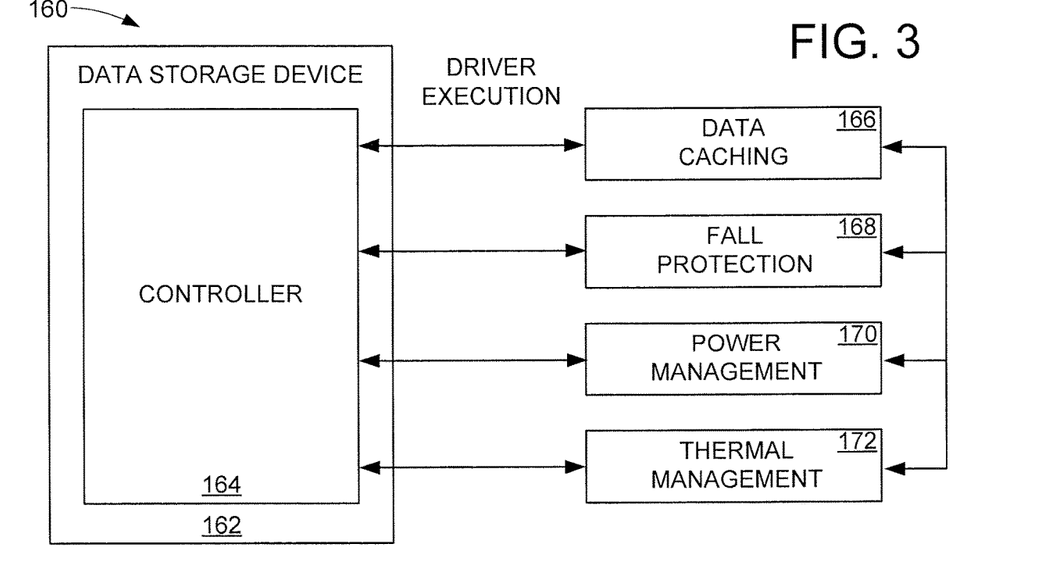
FIG. 3 shows a block representation of a portion of an example mobile computing device configured and operated in accordance with various embodiments.

FIG. 3 is a block representation of a portion of an example mobile computing device 160 constructed and operated in accordance with assorted embodiments. The mobile computing device 160 can have at least one data storage device 162 that has one or more dedicated or distributed controllers 164 that provide a range of computing capabilities through the execution of drivers. Various embodiments employ at least one driver to communicate with peripheral components to provide data caching 166, fall protection, 168, power management 170, and thermal management 172 capabilities. These capabilities can operate exclusively, redundantly, and collectively to optimize data storage device 162, and consequently mobile computing device 160, performance.

While the various capabilities can be utilized in any data storage device 162 that is part of mobile computing device 164 that may or may not have cooling means, it is contemplated that the controller 164 selectively monitors data storage device 162 conditions to employ one or more capabilities to balance power consumption with heat retention in a mobile computing device that lacks cooling means. For example, the thermal 172 and power 170 management schemes may be operating concurrently before data caching 166 is executed. As another non-limiting example, the fall protection 168 capability may suspend the power 170 and thermal 172 management schemes while conducting predictive and reactive data caching 166 that moves data to solid-state memory for temporary storage.

The ability to employ a variety of different capabilities may be retrofitted into a data storage device 162 that did not previously have a controller capable of such capabilities. However, a mobile enablement kit can alternatively be pre-loaded into the data storage device 152 during manufacture and prior to end-user data being stored to allow the various capabilities to be activated at any time. In an anticipated use, a data storage device 162 can be used in a desktop computer with cooling means and subsequently installed in a mobile computing tablet without cooling means where the mobile enablement kit recognizes the lack of cooling and establishes the predetermined capabilities through the utilization of a dynamic data driver that establishes communication between the controller 164 and the peripheral components needed to execute the capabilities. As such, the mobile enablement kit can optimize the implementation of capabilities with minimal need for supplemental software updates.

Figure 4:
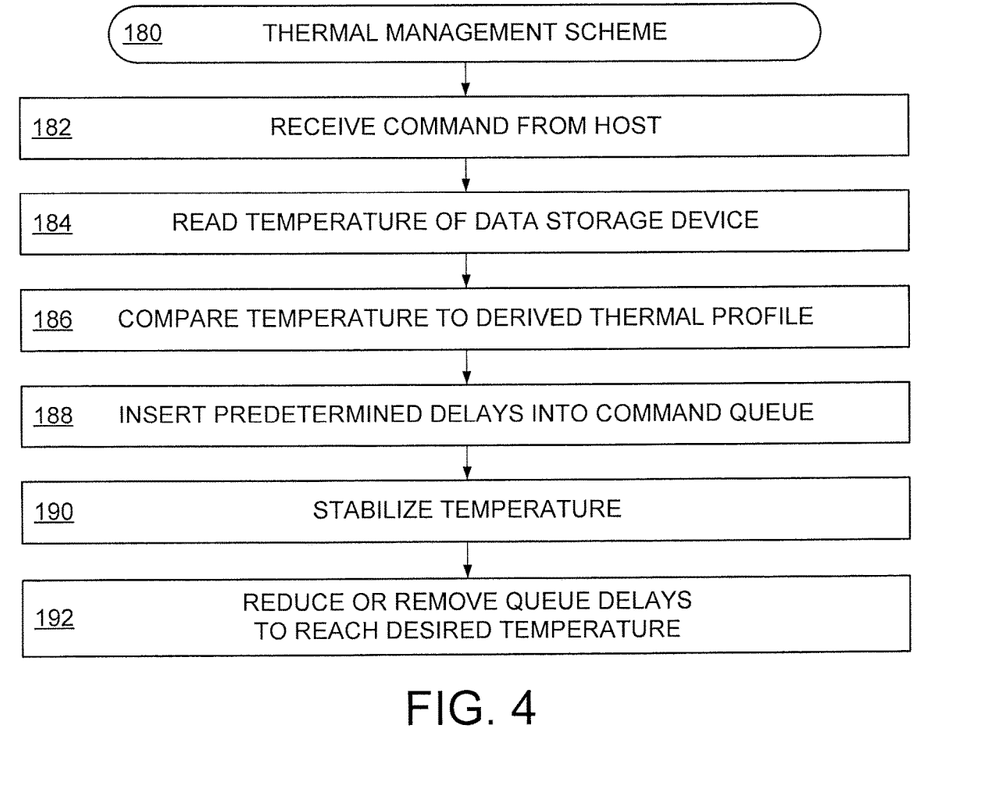
FIG. 4 provides an example thermal management scheme conducted in accordance with some embodiments.

With or without a mobile enablement kit installed on the data storage device 162, the controller 164 can continually, sporadically, and routinely conduct the thermal management 172 capability to monitor heat retention in the data storage device 162 and activate heat dissipation measures. FIG. 4 is a flowchart of an example thermal management scheme 180 that can be carried out by one or more controllers of a data storage device in accordance with some embodiments. Initially, the thermal management scheme 180 receives at least one command from a host in step 182. The received command may be the reading and programming of data to a data storage medium or may be an overhead maintenance operation, like writing of metadata, error correction codes, and servo data.

In the event the commands received in step 182 are data access requests, the commands are logged and scheduled in a command queue that can be populated for later execution, such as during low processing and system idle times. Step 184 next proceeds to read the temperature of the data storage device in response to the command queue receiving at least one new command. Step 184 can utilize any number of temperature sensing equipment and algorithms to read the current temperature as well as predict future temperature. Such predicted temperature may be rendered from a thermal profile derived from previously logged and predicted data storage device operating temperatures. For instance, temperatures can be logged and subsequently computed as part of an algorithm to render trends and typical thermal responses to computing operations like loading an operating system, reading data, and streaming video.

Step 186 utilizes the derived thermal profile in comparison to the temperature reading of step 184 to determine how the command received in step 182 could affect the thermal environment within the data storage device. A measured temperature that is well below the derived thermal profile may advance routine 180 to the execution of one or more commands present in the command queue. However, an elevated temperature compared to the thermal profile can trigger step 188 to insert time delays of predetermined duration into the command queue to reduce the amount of work, and consequently the amount of heat, produced by the data storage device. In other words, step 188 can allow the execution of the command queue, but inserts predetermined time delays, such as 2 seconds, in between commands so that the data storage device is not constantly producing elevated amounts of heat throughout the execution of the command queue.

In some embodiments, step 188 strategically inserts multiple delays of different times throughout the command queue to enhance heat dissipation in the data storage device despite execution of the constituent commands. Such strategic insertion of delays can be coordinated with respect to the derived thermal profile to provide the highest probability that a stabilized temperature can be reached in step 190 regardless of whether the command queue has completely been executed. To clarify, step 190 can be arrive at due to an unlimited variety of actions, such as the use of a single command queue time delay, multiple time delays, and suspension of all data storage device operations.

With the temperature stabilized in step 190, step 192 proceeds to reduce or remove some or all time delays present in the command queue. Such time delay modification can be a result of a data storage device temperature being below a certain threshold, such as 40° C., or the command queue being partially or fully completed. The ability to tune the command queue with time delays allows command execution and seamless user operation while controlling the temperature of the data storage device. Although the insertion of time delays into the command queue can allow heat to dissipate while the data storage device is not engaged in data access operations, the data storage device can consume power and generate heat without data access operations being conducted. For example, the spinning of data storage media can use power and generate heat via a spindle motor. Thus, the thermal management scheme 180 can be a useful tool to control heat and reach a desired temperature, time delays may be costly in terms of power and the amount of time needed to substantially reduce device temperature.

Figure 5:
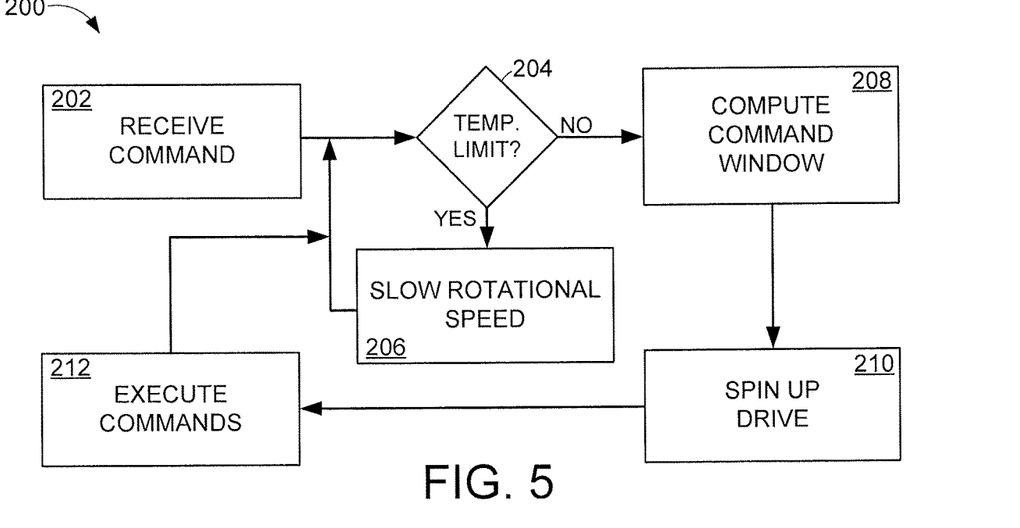
FIG. 5 maps an example command logic carried out in accordance with various embodiments.

Accordingly, logic, like the command logic 200 of FIG. 5, can be employed by a controller in accordance with various embodiments to reduce power consumption and heat generation in a data storage device. It should be noted that the command logic 200 is not exclusively conducted and may be partially executed while other controller capabilities, such as the thermal management scheme 180, data caching 166, and fall protection 168, are running. Returning to FIG. 5, the arrival of a command in step 202 triggers the evaluation of a temperature in the data storage device and a determination if a temperature threshold has been exceeded with decision 204. A temperature that exceeds the limit slows the rotational speed of the data storage media while suspending execution of the command queue in step 206. The reduction in media speed and suspension of command can allow heat to dissipate quickly while decreasing the amount of power being consumed.

Upon the media rotating at a reduced speed for a predetermined time, such as 30 seconds, decision 204 is revisited to determine if further rotational speed reductions are in order. If so, the data storage device can experience tiers of rotational speeds that eventually may result in powering the data storage device off. However, if decision 204 determines that the temperature of the device is safe to conduct command execution, step 208 then computes a command window based at least in part on a derived thermal profile predicting how the execution of commands will affect device temperature.

As a result of step 208, a window of time, power consumption, or amount of temperature fluctuation will be allowed that may, or may not, execute all the commands received in step 202 or resident in the command queue as step 210 increases the rotational speed of the data storage device and step 212 executes at least one command. It is contemplated that step 212 executes actual data access commands as well as time delays imposed by a thermal management scheme, but such execution is not required. The completion of step 212 for the designated command window from step 208 advances the logic 200 back to decision 204 where another evaluation of the temperature of the data storage device is conducted. Through the cyclical return to decision 204, the logic 200 can continually be focused on what the temperature of the data storage device is and take actions to reduce the temperature and power consumption of the device without degrading user experience as caching of data can service short term user requests.

The logic 200 of FIG. 5 can serve to strategically adjust device temperatures by reducing the rotational speed of the data storage media. While the data storage device could be simply powered off at the presence of an elevated temperature, such action would be detrimental to power consumption as it takes more power to spin the media up than is saved from spinning them down. In other words, logic 200 provides a balance of heat dissipation with power consumption by spinning the data storage media down gradually in response to elevated temperatures. During high volume command queue conditions, such as operating system loading, logic 200 can provide optimized heat and power balance that maintains system performance. However, in low or sporadic command queue conditions that can correspond with the use of mobile computing devices, logic 200 may not balance power consumption with heat dissipation as well due to the device spinning and heat being stable below the predetermined threshold.

Figure 6:
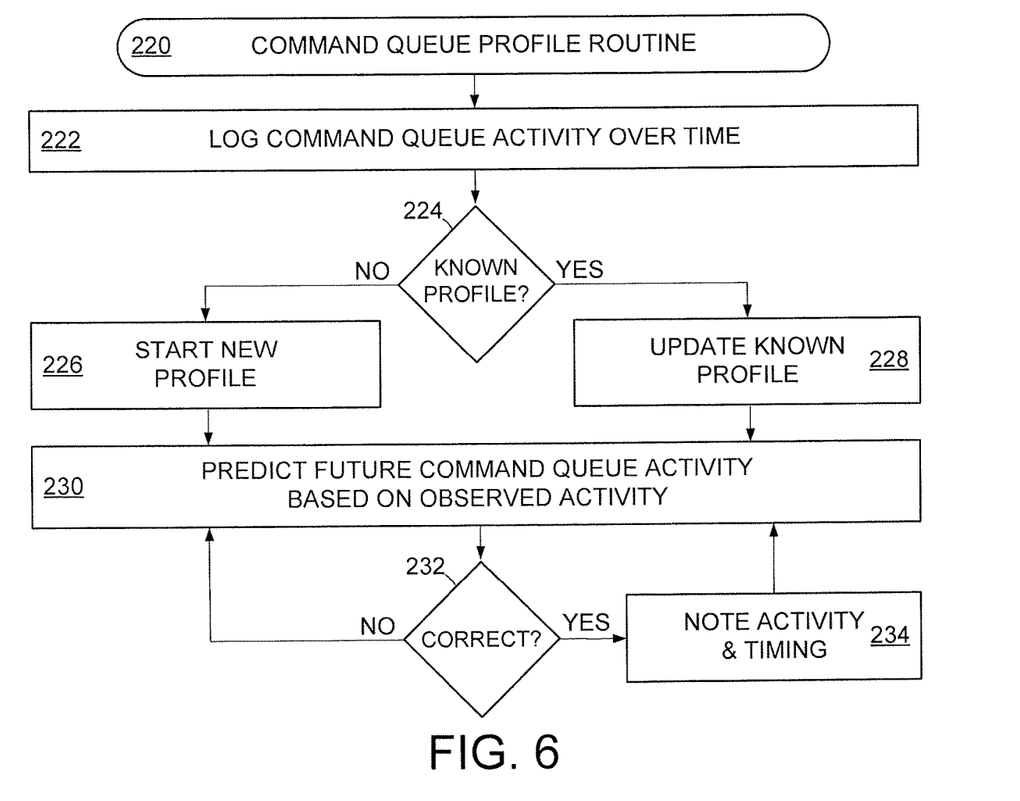
FIG. 6 displays an example command queue profile routine that may be utilized in accordance with assorted embodiments.

FIG. 6 provides an example command queue profile routine 220 that may be carried out in accordance with various embodiments to proactively allow at least one controller to maintain optimized mobile computing device performance while conditions, like device temperature and power consumption, change. The routine 220 can begin by logging at least one command queue activity over time in step 222. Such activity logging can be done locally and remotely in temporary or permanent storage locations.

Decision 224 next evaluates one or more logged command queue activities from step 222 to determine if a known activity profile is present. That is, decision 224 can evaluate the timing, situation, and sequence of logged activities to determine if a known activity profile is applicable. If no known profile fits the logged activities, step 226 starts a new profile that may stand alone or be implemented into another profile at a later time. If a known profile fits the logged activities, step 228 updates the known profile with the logged events, which may or may not alter the profile.

The registration of logged command queue activities in a new or known profile allows step 230 to predict future command queue activities based on the activities observed in step 222. As a non-limiting example, one or more algorithms can identify trends and situations from the activity profile that have a high probability of reoccurring, which is manifested in a prediction in step 230 of a reduction or increase in command queue activity volume. It is noted that a command queue may have a fixed execution rate and step 190 can predict the volume of unexecuted and partially executed commands, such as data reads, servo data maintenance, metadata updates, cache storage maintenance, and data writes.

Although sophisticated and simple algorithms may be employed in step 230, unexpected and previously non-encountered activities may occur. Decision 232 determines if the command queue activity predicted in step 230 is correct in an effort to validate, evolve, and maintain the accuracy of the activity profile as well as the algorithms used to predict future activity. A correct activity prediction triggers step 234 to note the command queue activity and the timing of the activity to allow the profile and associated algorithms to subsequently predict other future command queue events. If the predicted activity is wrong, decision 232 prompts step 230 to predict a new activity, which effectively deletes wrong predictions from inclusion into the activity profile or prediction algorithm.

With the ability to predict future command queue activities, like command volume and urgency, a controller can conduct measures to manage temperatures in a mobile computing device without an active cooling means, such as a fan, vacuum, or vent. The use of the thermal management scheme 180 of FIG. 4, command logic 200 of FIG. 5, and command queue profile routine 220 of FIG. 6 can be used individually and concurrently to balance power consumption with temperature control. In some embodiments, the controller of a data storage device intelligently executes the various schemes and logic to adapt to how the mobile computing device is being used. The example temperature management routine 240 of FIG. 7 can be carried out in accordance with various embodiments to selectively utilize a variety of different power and heat conscious schemes and logic.

Figure 7:
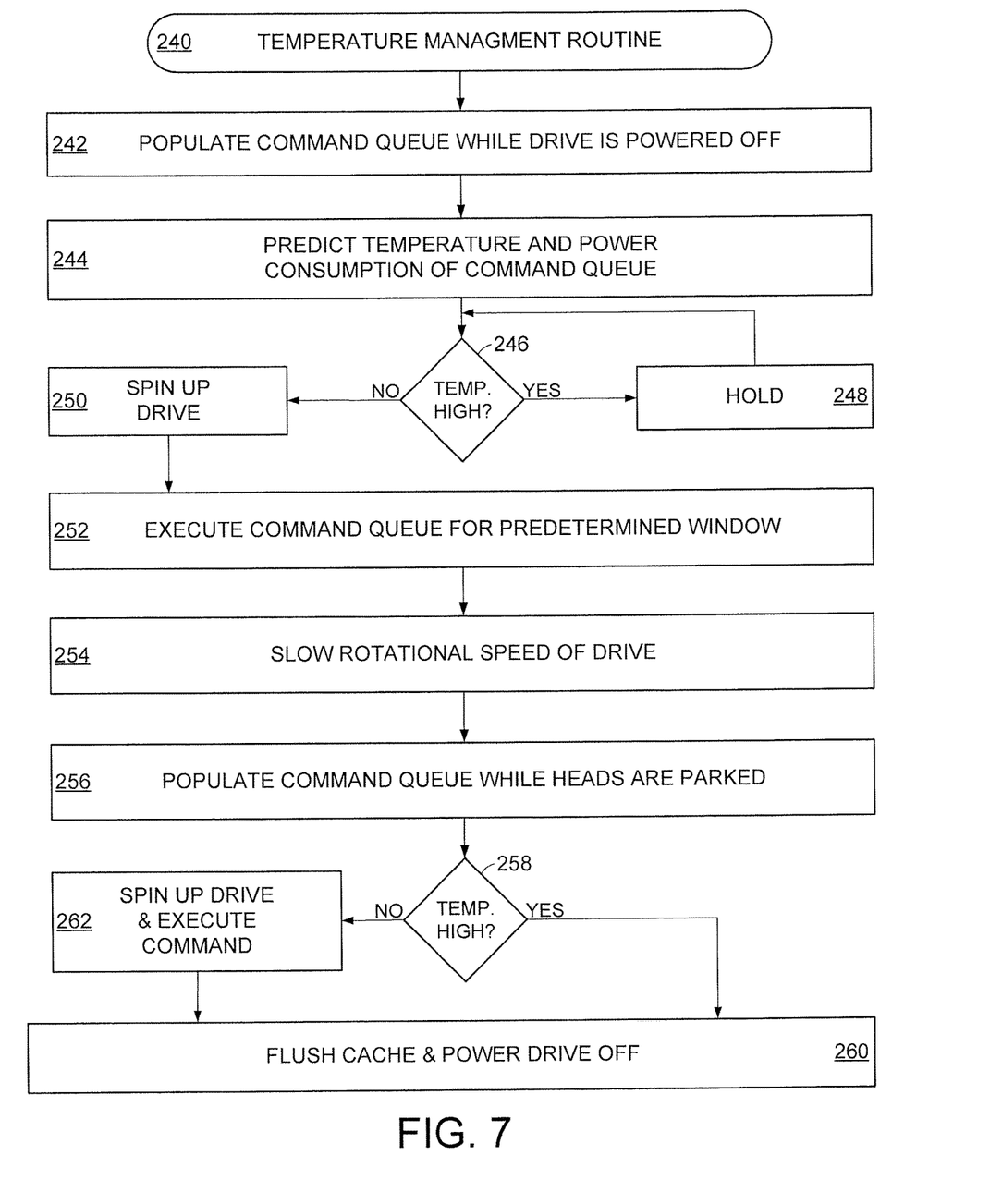
FIG. 7 is a flowchart of an example temperature management routine carried out in accordance with various embodiments.

Step 242 begins by populating a command queue while the data storage device is powered off, which is defined by no rotation of the constituent data storage media and the transducing heads being parked. It is noted that while routine 240 begins while a data storage device is powered off, such condition is not required or limiting as the routine 240 can be active while a device is in use. A populated command queue advances to step 244 where the power consumption and temperature of executing some or all of the command queue are predicted in relation to a derived temperature profile based on a thermal mass and previously logged power and temperature conditions. For example, the temperature alteration as a result of a data programming operation for a 5 mm data storage medium can follow a profile predicted by a performance algorithm.

The prediction of the temperature and power consumption in step 244 is followed by an evaluation of the temperature of the data storage device in decision 246. If the temperature is too high to sustain the execution of at least some of the command queue commands, step 248 holds any command queue execution and returns to a temperature evaluation in decision 246. A device temperature that can sustain command execution then spins up the data storage media in step 250 and subsequently executes command queue command for a predetermined command window. Some embodiments maintain the operational speed of the data storage media for a selected time, such as 1 minute, but such waiting is not required before step 254 slows the rotational speed of the media to a predetermined intermediate speed. For example, a 1000 rpm reduction and parking of the transducing heads can correspond to step 254 along with a significant reduction in power consumption from 1.6 W to 0.6 W.

Step 254 may further involve the gradual or abrupt reduction in media rotational speed depending on how and when commands populate the command queue in step 256. Once the command queue does receive a prerequisite number of command queues, which may be measured in power consumed, timed to execute, or predicted heat generation, decision 258 again senses if the data storage device is hotter than a threshold temperature or will be hotter at the conclusion of command execution. In the event the temperature is too hot, step 260 flushes cache and powers the drive off while the command queue is suspended. In contrast, a cool device temperature increases the media rotational speed and executes at least one command in accordance with a command window in step 262 before powering the device off in step 260.

It can be appreciated that routine 240 can provide sophisticated power and heat management through the utilization of one or more schemes and logic. However, the various aspects of routine 240 are not required or limiting as any portion of the routine 240 can be changed, added, and removed at will. For example, a step can be inserted that generates a command window, computes temperature trends via a temperature algorithm, and predictively caches operating system data while the media are at an operational speed.

Through the assorted embodiments described herein, a mobile computing device can experience temperature management despite not having cooling means. The selective and intelligent use of the thermal management scheme and command logic allows temperature to be controlled without degrading system responsiveness. Moreover, the use of the power management scheme can efficiently control data storage device operation to complement the dissipation of heat while minimizing the amount of power being consumed, which is increasingly stressed by the reduced form factor of batteries in mobile computing devices.

It will be appreciated that the technology described above can readily be utilized in any number of applications, including computing environments with cooling means. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

The invention claimed is:

1. An apparatus comprising a mobile data storage device housed in a mobile computing device without a cooling feature, the mobile data storage device comprising a controller configured to delay execution of at least one command in response to a predicted mobile data storage device temperature by inserting at least one time delay into a command queue stored in the mobile data computing device.

2. The apparatus of claim 1, wherein the mobile data storage device is a hard disk drive.

3. The apparatus of claim 1, wherein the mobile computing device is a laptop computer.

4. The apparatus of claim 1, wherein the mobile computing device is a tablet computer.

5. The apparatus of claim 1, wherein the mobile data storage device comprises a cache memory connected to the controller, the cache memory storing the command queue comprising the at least one command.

6. The apparatus of claim 1, wherein the mobile data storage device comprises a mobile enablement software configured to recognize the presence of cooling feature.

7. The apparatus of claim 6, wherein the mobile enable software utilizes a dynamic data driver configured to connect the controller with at least one peripheral component.

8. The apparatus of claim 1, wherein the controller is connected to a fall protection circuit in the mobile data storage device, the fall protection circuit configured to suspend the at least one time delay while the controller proactively moves data to a cache memory of the mobile computing device.

9. An apparatus comprising a mobile data storage device housed in a mobile computing device without a cooling feature, the mobile data storage device comprising a controller configured to delay execution of at least one command of a command queue and reduce a rotating speed of a data storage medium housed in the mobile data storage device in response to a mobile data storage device temperature predicted by the controller.

10. A method comprising:
housing a mobile data storage device in a mobile computing device, the mobile computing device configured without a cooling feature, the mobile data storage device comprising a controller;
predicting a mobile data storage device temperature with the controller; and
inserting a first time interval having a first duration and a second time interval having a second duration, different from the first duration, in a command queue to delay execution of at least one command in response to the predicted mobile data storage device temperature, the at least one command stored in the command queue in the mobile computing device.

11. The method of claim 10, wherein the mobile data storage device temperature is predicted based on a derived thermal profile of logged mobile data storage device temperatures and activities.

12. The method of claim 11, wherein the derived thermal profile predicts one or more operating temperatures and power consumption corresponding to the execution of at least some of the commands in the command queue.

13. The method of claim 10, wherein the first interval suspends operation of the command queue throughout the first duration.

14. The method of claim 13, wherein a first duration is less than the second duration.

15. The method of claim 10, wherein the first-interval corresponds with a reduction in rotating speed of a data storage medium incorporated in the mobile data storage device.

16. The method of claim 10, wherein the second interval is removed in response to the mobile data storage device falling below a threshold operating temperature.

17. The method of claim 16, wherein the controller flushes at least one command in the command queue in response to the maximum predicted mobile data storage device temperature being above the threshold operating temperature.

18. The apparatus of claim 17, wherein the predicted mobile data storage device temperature is 40° C. or above.

19. The apparatus of claim 17, wherein the mobile data storage device comprises at least one transducing head suspended proximal the data storage medium.

20. The method of claim 10, wherein the controller inserts a plurality of intervals to delay the execution of any commands present in the command queue until a maximum predicted mobile data storage device temperature is below a threshold operating temperature.

* * * * *